(12) United States Patent
Hayashi

(10) Patent No.: US 11,010,612 B2
(45) Date of Patent: May 18, 2021

(54) INFORMATION GENERATION DEVICE, INFORMATION GENERATION METHOD, COMPUTER PROGRAM, AND IN-VEHICLE DEVICE

(71) Applicant: Sumitomo Electric Industries, Ltd., Osaka (JP)

(72) Inventor: Yoshiaki Hayashi, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 16/625,240

(22) PCT Filed: Nov. 30, 2018

(86) PCT No.: PCT/JP2018/044111
§ 371 (c)(1),
(2) Date: Dec. 20, 2019

(87) PCT Pub. No.: WO2019/159494
PCT Pub. Date: Aug. 22, 2019

(65) Prior Publication Data
US 2020/0143167 A1 May 7, 2020

(30) Foreign Application Priority Data
Feb. 13, 2018 (JP) .............................. JP2018-022896

(51) Int. Cl.
*G06K 9/00* (2006.01)
*G06F 3/14* (2006.01)
(Continued)

(52) U.S. Cl.
CPC ....... *G06K 9/00671* (2013.01); *G06F 3/1423* (2013.01); *G06K 9/00791* (2013.01);
(Continued)

(58) Field of Classification Search
None
See application file for complete search history.

(56) References Cited

U.S. PATENT DOCUMENTS

2007/0165910 A1* 7/2007 Nagaoka ............... B60W 40/04
382/104
2010/0253494 A1* 10/2010 Inoue ..................... G08G 1/168
340/436

(Continued)

FOREIGN PATENT DOCUMENTS

JP 2000-131432 A 5/2000
JP 2006-293835 A 10/2006
(Continued)

*Primary Examiner* — Ryan M Gray
(74) *Attorney, Agent, or Firm* — Baker Botts L.L.P.; Michael A. Sartori

(57) ABSTRACT

An information generation device comprises a processor that acquires sensor information indicating a measurement result of a detection target area from each of a plurality of sensors having the detection target area that is common to the plurality of sensors, that determines whether or not each of the plurality of sensors detects an object existing in the same predetermined area on the basis of a plurality of pieces of the sensor information acquired, and that generates first display information for separately displaying the object that is detected by each of the plurality of sensors in a case where a determination result is positive and a predetermined condition for determining whether or not a plurality of the objects detected by the plurality of sensors are the same object is not satisfied, and generates second display information for displaying the object detected by each of the plurality of sensors in a display style different from a display style of the first display information in a case where the determination result is positive and the predetermined condition is satisfied.

20 Claims, 11 Drawing Sheets

(51) Int. Cl.
  *G06K 9/46* (2006.01)
  *H04Q 9/00* (2006.01)
(52) U.S. Cl.
  CPC ............ *G06K 9/4652* (2013.01); *H04Q 9/00*
  (2013.01); *G06K 2209/21* (2013.01)

(56) References Cited

U.S. PATENT DOCUMENTS

| | | | | |
|---|---|---|---|---|
| 2014/0350854 | A1* | 11/2014 | Sugimoto | G01C 21/3605 |
| | | | | 701/537 |
| 2015/0054673 | A1* | 2/2015 | Baba | G01S 13/867 |
| | | | | 342/27 |
| 2015/0339534 | A1* | 11/2015 | Morikawa | G08G 1/164 |
| | | | | 345/633 |
| 2017/0347066 | A1* | 11/2017 | Song | G06K 9/00785 |
| 2018/0350083 | A1* | 12/2018 | Fang | G01S 17/931 |
| 2018/0373940 | A1* | 12/2018 | Robinson | G06K 9/00791 |
| 2019/0232956 | A1* | 8/2019 | Takaki | B60W 30/0956 |

FOREIGN PATENT DOCUMENTS

| | | |
|---|---|---|
| JP | 2009-206750 A | 9/2009 |
| JP | 2015-215201 A | 12/2015 |
| JP | 2017-083477 A | 5/2017 |
| WO | 2017/017766 A1 | 2/2017 |

\* cited by examiner

INFORMATION GENERATION DEVICE, INFORMATION GENERATION METHOD, COMPUTER PROGRAM, AND IN-VEHICLE DEVICE

CROSS-REFERENCE TO RELATED APPLICATIONS

This application is the national phase under 35 U.S.C. § 371 of PCT International Application No. PCT/JP2018/044111 which has International filing date of Nov. 30, 2018 and designated the United States of America.

FIELD

The present technology relates to an information generation device, an information generation method, a computer program, and an in-vehicle device.

Priority is claimed on Japanese Patent Application No. 2018-022896, filed Feb. 13, 2018, the entire content of which is incorporated herein by reference.

BACKGROUND AND SUMMARY

In the related art, a display control system that displays sensor information received from a plurality of sensors on a display device is suggested.

In the display control system, when displaying the information received from the plurality of sensors on a plurality of display devices, display information conforming to each of the display devices is generated.

And the display control system causes the display device to display the display information.

(1) To accomplish the above-described object, according to an embodiment of a disclosure, there is provided an information generation device including: a sensor information acquisition unit that acquires sensor information indicating a measurement result of a detection target area from each of a plurality of sensors having the detection target area that is common to the plurality of sensors; a determination unit that determines whether or not each of the plurality of sensors detects an object existing in the same predetermined area on the basis of a plurality of pieces of the sensor information acquired by the sensor information acquisition unit; and a display information generation unit that generates first display information for separately displaying the object that is detected by each of the plurality of sensors in a case where a determination result of the determination unit is positive and a predetermined condition for determining whether or not a plurality of the objects detected by the plurality of sensors are the same object is not satisfied, and generates second display information for displaying the object detected by each of the plurality of sensors in a display style different from a display style of the first display information in a case where the determination result is positive and the predetermined condition is satisfied.

(20) According to another embodiment of the disclosure, there is provided an information generation method including: a step of acquiring sensor information indicating a measurement result of a detection target area from each of a plurality of sensors having the detection target area that is common to the plurality of sensors; a step of determining whether or not each of the plurality of sensors detects an object existing in the same predetermined area on the basis of a plurality of pieces of the acquired sensor information; and a step of generating first display information for separately displaying the object that is detected by each of the plurality of sensors in a case where a determination result in the determining step is positive and a predetermined condition for determining whether or not a plurality of the objects detected by the plurality of sensors are the same object is not satisfied, and generating second display information for displaying the object detected by each of the plurality of sensors in a display style different from a display style of the first display information in a case where the determination result is positive and the predetermined condition is satisfied.

(21) According to still another embodiment of the disclosure, there is provided a computer program causing a computer to function as: a sensor information acquisition unit that acquires sensor information indicating a measurement result of a detection target area from each of a plurality of sensors having the detection target area that is common to the plurality of sensors; a determination unit that determines whether or not each of the plurality of sensors detects an object existing in the same predetermined area on the basis of a plurality of pieces of the sensor information acquired by the sensor information acquisition unit; and a display information generation unit that generates first display information for separately displaying the object that is detected by each of the plurality of sensors in a case where a determination result of the determination unit is positive and a predetermined condition for determining whether or not a plurality of the objects detected by the plurality of sensors are the same object is not satisfied, and generates second display information for displaying the object detected by each of the plurality of sensors in a display style different from a display style of the first display information in a case where the determination result is positive and the predetermined condition is satisfied.

(22) According to still another embodiment of the disclosure, there is provided an in-vehicle device including: a display information acquisition unit that acquires at least one piece of display information between the first display information and the second display information from the information generation device, the first display information and the second display information being generated by the information generation device; and a display control unit that controls display on a screen based on the display information acquired by the display information acquisition unit.

DETAILED DESCRIPTION OF NON-LIMITING EXAMPLE EMBODIMENTS

Figure 1:
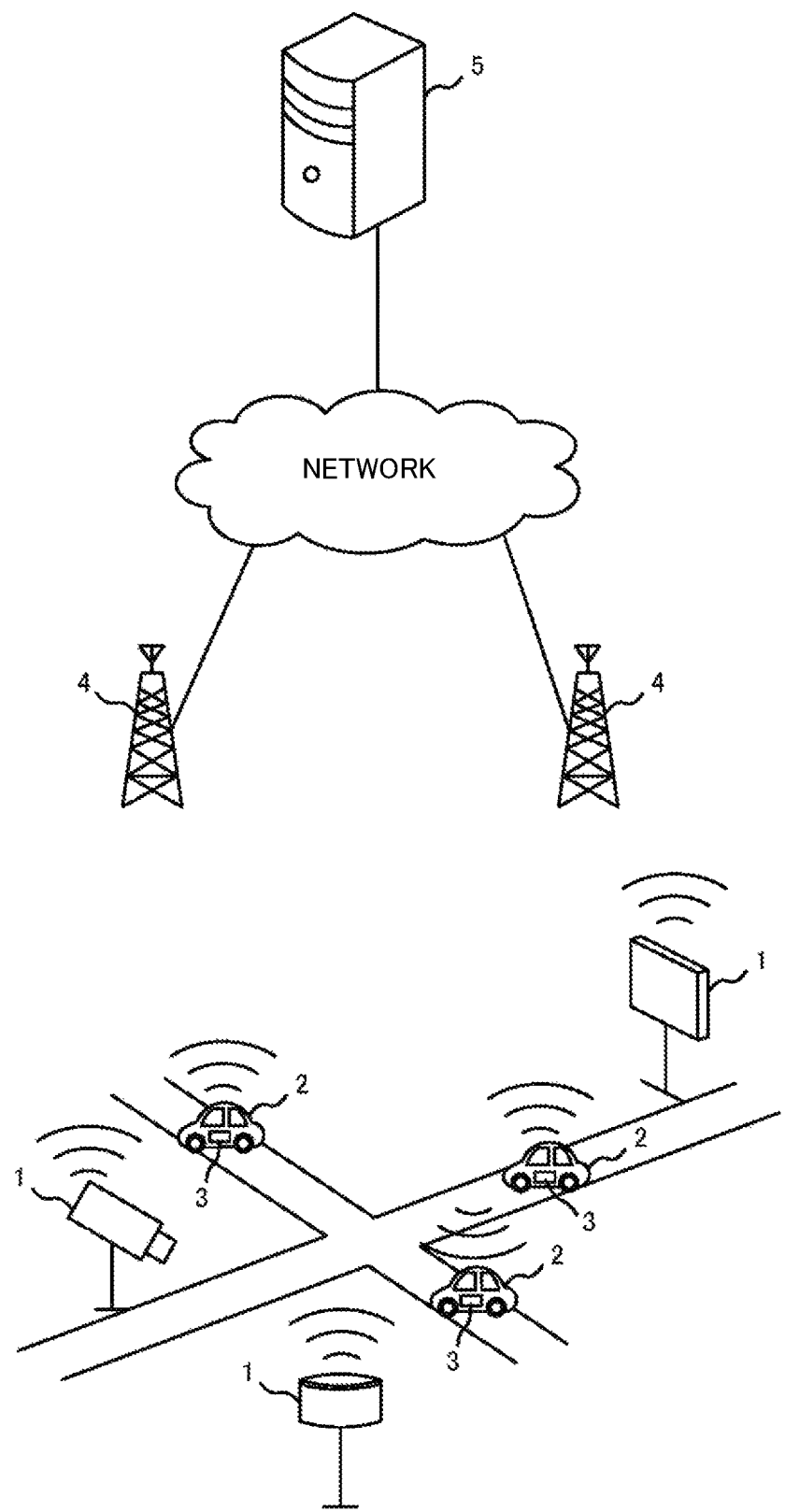
FIG. 1 is an overall configuration diagram of a radio communication system according to an embodiment of the disclosure.

It is desired to generate information that is useful for drive assisting control of a vehicle such as an automobile by using a plurality of pieces of sensor information as an information source.

However, in the display control system of the related art, a focus is given to a display method corresponding to a display device, and there is no consideration on how to display an object detected by a plurality of sensors. The sensors have various degrees of precision, and even though the sensors have high precision, it may be difficult to appropriately detect an object by the sensors depending on existence of a shielding object or the like between the sensors and the object.

For example, in a measurement target area in which the plurality of sensors overlap each other, in a case where the sensors detect an object, the same object may be erroneously detected as a separate object due to a difference in detection precision between the sensors. In this case, display information in which the same object is set as separate objects is generated, and thus it may be difficult to perform appropriate drive assisting control.

The present disclosure has been made in consideration of such circumstances, and an object thereof is to provide an information generation device, an information generation method, a computer program, and an in-vehicle device which are capable of generating appropriate display information from a plurality of pieces of sensor information.

According to the present disclosure, it is possible to generate appropriate display information from a plurality of pieces of sensor information.

First, a summary of embodiments of the invention will be described.

(1) An information generation device according to an embodiment of the invention includes: a sensor information acquisition unit that acquires sensor information indicating a measurement result of a detection target area from each of a plurality of sensors having the detection target area that is common to the plurality of sensors; a determination unit that determines whether or not each of the plurality of sensors detects an object existing in the same predetermined area on the basis of a plurality of pieces of the sensor information acquired by the sensor information acquisition unit; and a display information generation unit that generates first display information for separately displaying the object that is detected by each of the plurality of sensors in a case where a determination result of the determination unit is positive and a predetermined condition for determining whether or not a plurality of the objects detected by the plurality of sensors are the same object is not satisfied, and generates second display information for displaying the object detected by each of the plurality of sensors in a display style different from a display style of the first display information in a case where the determination result is positive and the predetermined condition is satisfied.

According to this configuration, in a case where each of a plurality of sensors detects an object existing in a predetermined area, it is possible to change a display style of an object between a case where a predetermined condition is satisfied and a case where the predetermined condition is not satisfied. For example, in a case where a plurality of objects are different objects, the plurality of objects are separately displayed, and in a case where the plurality of objects are the same object, the plurality of objects can be displayed in a display style different from a display style in the above-described display. According to this, a user can understand whether or not the plurality of objects are determined as different objects or the same object. According to this, it is possible to generate appropriate display information from a plurality of pieces of sensor information.

(2) Preferably, an area within a predetermined distance from an object position based on sensor information obtained from any one of the plurality of sensors is set as the predetermined area.

According to this configuration, it is easy to set the predetermined area so that a single object is included in the predetermined area.

(3) More preferably, the second display information includes information for displaying any one of objects detected by each of the plurality of sensors.

According to this configuration, for example, in a case where a plurality of objects existing in the predetermined area are the same object, it is possible to allow only one object to be displayed. According to this, it is possible to display an object in the same number of an actual object.

(4) In addition, the display information generation unit generates the second display information for displaying the object that is selected by selecting the any one of the objects on the basis of types of the plurality of sensors.

According to this configuration, it is possible to select and display an object that is selected by a sensor with high detection precision. According to this, it is possible to display the object with high precision.

(5) In addition, the display information generation unit may generate the second display information for displaying the object that is selected by selecting the any one of the objects on the basis of an installation target of the plurality of sensors.

According to this configuration, for example, it is possible to select an object with priority given to a detection result of a road-side sensor that is installed on a road side or the like in comparison to a detection result of an in-vehicle sensor. The road-side sensor is fixed, and thus position precision of the sensor is higher in comparison to the in-vehicle sensor that moves, and thus detection precision of an object becomes higher. As a result, it is possible to display an object with high precision.

(6) In addition, the display information generation unit generates the second display information for displaying the object that is selected by selecting the any one of the objects on the basis of a distance from each of the sensors up to the object that is detected by each of the sensors.

According to this configuration, for example, in a state in which priority is given to a sensor that is close to an object, it is possible to select the object that is detected by the sensor. At a position close to the sensor, it is possible to detect the object with higher precision in comparison to a distant position. According to this, it is possible to display the object with high precision.

(7) In addition, the second display information may include information for displaying an object obtained by integrating the plurality of objects detected by the plurality of sensors.

According to this configuration, in a case where a plurality of objects existing in a predetermined area are the same object, it is possible to display the plurality of objects by integrating the objects into one object. According to this, it is possible to display an object in the same number of an actual object.

(8) In addition, the second display information may include information for displaying the object that is detected by each of the plurality of sensors as the object flickering.

According to this configuration, in a case where a plurality of objects existing in a predetermined area are the same object, it is possible to display the plurality of objects while being flickered. According to this, it is possible to notify a user of a situation in which the plurality of objects are the same object.

(9) In addition, the second display information may include information for displaying single object at an average position of the plurality of objects detected by the plurality of sensors.

According to this configuration, in a case where a plurality of objects existing in a predetermined area are the same object, it is possible to allow only one object to be displayed. In addition, a display position of the object is an average position of the plurality of objects. When averaging positions, it is possible to make a position of an object be closer to an accurate position. According to this, it is possible to display objects in the same number of actual objects at an accurate position.

(10) In addition, the predetermined condition may include a condition based on a position of the object detected by each of the plurality of sensors.

According to this configuration, on the basis of positions of a plurality of objects existing in a predetermined area, it is possible to determine whether or not the plurality of objects are the same object.

(11) In addition, the predetermined condition may include a condition in which a distance between the plurality of objects detected by the plurality of sensors at a predetermined time in the past is equal to or less than a predetermined distance threshold value.

In a case where a plurality of objects are the same as each other, the plurality of objects exist at the same position at a predetermined time in the past. Accordingly, it is possible to accurately determine whether or not the plurality of objects existing in the predetermined area are the same object through determination of the above-described predetermined condition.

(12) In addition, the predetermined condition may include a condition in which a direction difference between the plurality of objects detected by the plurality of sensors is equal to or less than a predetermined angle threshold value.

In a case where a plurality of objects are the same as each other, the plurality of objects face the same direction. Accordingly, it is possible to accurately determine whether or not the plurality of objects existing in the predetermined area are the same object through determination of the above-described predetermined condition.

(13) In addition, the predetermined condition may include a condition in which a speed difference between the plurality of objects detected by the plurality of sensors is equal to or less than a predetermined speed threshold value.

In a case where a plurality of objects are the same as each other, speeds of the plurality of objects are the same as each other. Accordingly, it is possible to accurately determine whether or not the plurality of objects existing in the predetermined area are the same object through determination of the above-described predetermined condition.

(14) In addition, each of the threshold values may be determined on the basis of types of the plurality of sensors.

Detection precision of sensors is different depending on the types of sensors. Accordingly, in a case where each of a plurality of sensors with high precision detects an object existing in a predetermined area, a threshold value is set to a small value. In a case where each of a plurality of sensors with low precision detects an object existing in the predetermined area, the threshold value is set to a large value. According to this, it is possible to accurately determine whether or not a plurality of the objects existing in the predetermined area are the same object.

(15) In addition, each of the threshold values may be determined on the basis of an installation target of the plurality of sensors.

For example, a road-side sensor installed on a road side or the like has detection precision higher than that of an in-vehicle sensor. Accordingly, in a case where each of a plurality of road-side sensors detects an object, a threshold value is set to a small value. In a case where each of a plurality of in-vehicle sensors detects an object, the threshold value is set to a large value. According to this, it is possible to accurately determine whether or not a plurality of the objects existing in a predetermined area are the same object.

(16) In addition, each of the threshold values may be determined on the basis of detection precision of the plurality of sensors.

According to this configuration, in a case where each of a plurality of sensors with high precision detects an object existing in a predetermined area, the threshold value is set to a small value. In a case where each of a plurality of sensors with low precision detects an object existing in the predetermined area, the threshold value is set to a large value. According to this, it is possible to accurately determine whether or not a plurality of the objects existing the predetermined area are the same object.

(17) In addition, each of the threshold values may be determined on the basis of position precision of the plurality of sensors.

A position of an object is determined on the basis of a position of a sensor and a distance from the sensor up to the object, and thus position precision of the sensor has an influence on position precision of the object. Accordingly, in a case where each of a plurality of sensors with high position precision detects an object existing in a predetermined area, the threshold value is set to a small value. In a case where each of a plurality of sensors with low position precision detects an object existing in the predetermined area, the threshold value is set to a large value. According to this, it is possible to accurately determine whether or not a plurality of the objects existing in the predetermined area are the same object.

(18) In addition, the predetermined condition may include a condition based on at least one of a size, a color, and a shape of the object that is detected by each of the plurality of sensors.

Vehicles which travel in the same lane, or vehicles which travel in adjacent lanes may travel to a nearby position in the same direction and at the same speed. In this case, it may be difficult to determine whether or not the vehicles are the same object. In this case, when performing a determination process of a condition on the basis of at least one among a size, a color, and a shape of the object, it is possible to accurately determine whether or not a plurality of objects existing in a predetermined area are the same object.

(19) In addition, the determination unit may determine whether or not to set the object as a determination target on the basis of a position relationship between each of the sensors and the object detected by each of the sensors.

According to this configuration, for example, only in a case where an object exists within a detection range of a sensor, and a distance up to the object is short, it is possible to determine whether or not a plurality of the objects existing in a predetermined area are the same object. Accordingly, it is possible to allow a determination process to be performed only with respect to an object of which detection precision is high without performing the determination process with respect to an object which is located at a location distant from a sensor and of which detection precision is low. According to this, it is possible to enhance reliability of the determination process, and it is possible to accurately determine whether or not a plurality of the objects existing in a predetermined area are the same object.

(20) An information generation method according to another embodiment of the invention includes processes which are executed by the information generation device.

According to this, it is possible to obtain the same operation and effect as in the information generation device.

(21) A computer program according to still another embodiment of the invention causes a computer to function as the information generation device.

According to this, it is possible to obtain the same operation and effect as in the information generation device.

(22) An in-vehicle device according to still another embodiment of the invention includes: a display information acquisition unit that acquires at least one piece of display information between the first display information and the second display information from the information generation device, the first display information and the second display information being generated by the information generation device; and a display control unit that controls display on a screen based on the display information acquired by the display information acquisition unit.

According to this configuration, it is possible to display at least one piece of display information between first display information and second display information which are created by the information generation device on a screen. According to this, it is possible to display appropriate display information on a screen, the appropriate display information being generated from a plurality of pieces of sensor information.

Hereinafter, embodiments of the invention will be described in detail with reference to the accompanying drawings. Note that, the embodiments to be described below a preferred specific example of the invention. Numerical values, shapes, materials, constituent elements, arrangement positions and connection styles of the constituent elements, steps, a sequence of the steps, and the like in the following embodiments are illustrative only, and are not intended to limit the invention. The invention is specified by the appended claims. Accordingly, among constituent elements in the following embodiments, with regard to constituent elements which are not described in an independent claim illustrating the highest concept of the invention, description will be made on the assumption that the constituent elements are not necessary to accomplish the object of the invention but the constituent elements constitute a more preferable style.

In addition, the same reference numeral will be given to the same constituent element. A function and a name thereof are the same, and thus description thereof will be appropriately omitted.

[Overall Configuration of Radio Communication System]

FIG. 1 is an overall configuration diagram of a radio communication system according to an embodiment of the disclosure.

As illustrated in FIG. 1, the radio communication system of this embodiment functions as a vehicle control system, and includes a plurality of road-side sensors 1 and a vehicle 2 which can perform radio communication, one or a plurality of base stations 4 which perform radio communication with the road-side sensors 1 and the vehicle 2, and a server 5 that performs communication with the base station 4 over a network in a wired manner or a wireless manner.

The base station 4 is constituted by at least one among a macrocell base station, a microcell base station, and a picocell base station.

In the radio communication system of this embodiment, for example, the server 5 is constituted by a general-purpose server capable of realizing software-defined networking (SDN). In addition, the base station 4 and a relay device such as a repeater (not illustrated) are constituted by a transport device capable of realizing the SDN.

A network visualization technology represented by the above-described SDN is a basic concept of "fifth generation mobile communication system" (hereinafter, abbreviated as "5th generation (5G)") of which standardization is in progress at a current point of time. Accordingly, the mobile communication system of this embodiment is constituted by, for example, 5G.

The road-side sensors 1 have a radio communication function, and include various sensors such as an image-type vehicle detector or LiDAR which is installed on a road, and a security camera that is installed outdoors or indoors.

The vehicle 2 includes an in-vehicle device 3 having a radio communication function. The in-vehicle device 3 includes a camera and various sensors (hereinafter, referred to as "in-vehicle sensor") such as a millimeter wave radar.

Examples of the vehicle 2 include not only a typical passenger car but also a public vehicle such as a fixed-route bus and an emergency vehicle. In addition, the vehicle 2 may be not only a four-wheeled vehicle but also a two-wheeled vehicle (motorcycle).

A driving type of the vehicle 2 may be any one among engine driving, electric motor driving, and a hybrid type. A drive type of the vehicle 2 may be any one among typical drive in which an occupant performs an operation such as acceleration/deceleration and handle steering, and automatic drive in which the operation is executed by software.

[Configuration of Server]

Figure 2:
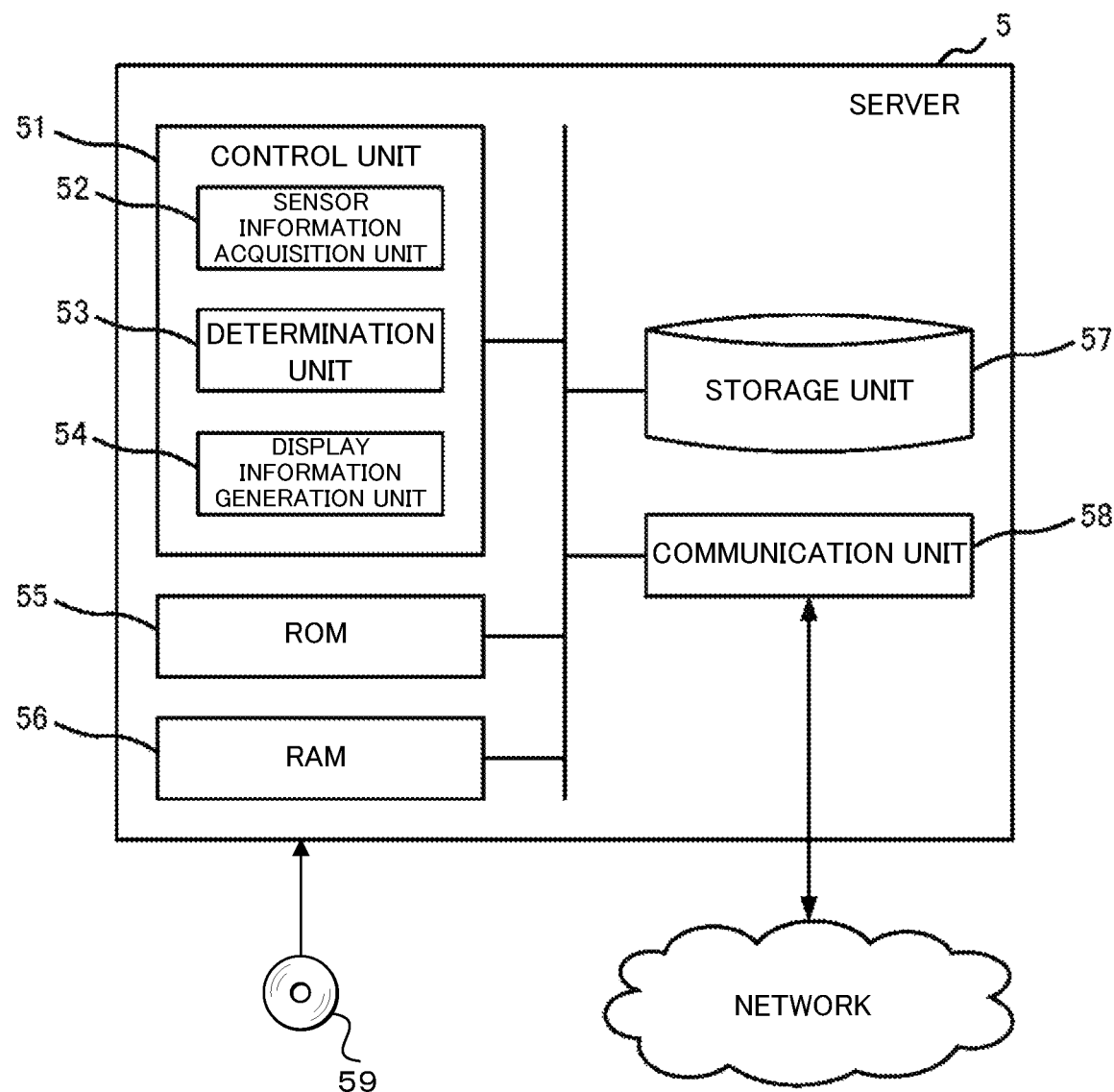
FIG. 2 is a block diagram illustrating an example of a configuration of a server.

FIG. 2 is a block diagram illustrating an example of a configuration of the server 5.

As illustrated in FIG. 2, the server 5 functions as an information generation device, and includes a control unit 51 including a central processing unit (CPU) and the like, a read only memory (ROM) 55, a random access memory (RAM) 56, a storage unit 57, and a communication unit 58.

The control unit 51 controls an operation of each piece of hardware and cause a computer device to function as the server 5 capable of performing communication with the base station 4 by reading out one or a plurality of programs stored in the ROM 55 in advance to the RAM 56, and by executing the programs. That is, the control unit 51 includes a sensor information acquisition unit 52, a determination unit 53, and a display information generation unit 54 as a processing unit realized by executing the programs. The programs may be installed from a recording medium 59 such as CD-ROM, DVD-ROM, or flash memory or the like which records the program. The server 5 may read out the programs in the recording medium 59 and store the programs in the RAM 56 or store the programs the storage unit 57 for executing the programs.

The RAM 56 is constituted by a volatile memory element such as a static RAM (SRAM) or a dynamic RAM (DRAM), and temporarily stores the programs executed by the control unit 51 and data necessary for the execution.

The storage unit 57 is constituted by a nonvolatile memory element such as a flash memory or electrically erasable programmable read only memory (EEPROM), or a magnetic storage device such as a hard disk.

The communication unit 58 is constituted by a communication device that performs a communication process corresponding to 5G, and performs communication with the base station 4 through the network. The communication unit 58 transmits information transmitted from the control unit 51 to an external device through the network, and provides information received through the network to the control unit 51.

The sensor information acquisition unit 52 of the control unit 51 acquires various pieces of sensor information measured by the vehicle 2, the road-side sensors 1, or the like in a service area of the server 5 for a predetermined period from the vehicle 2, the road-side sensor 1, or the like. That is, the sensor information acquisition unit 52 acquires sensor information indicating a measurement result of the sensors with respect to a detection target area from the sensors.

Figure 3:
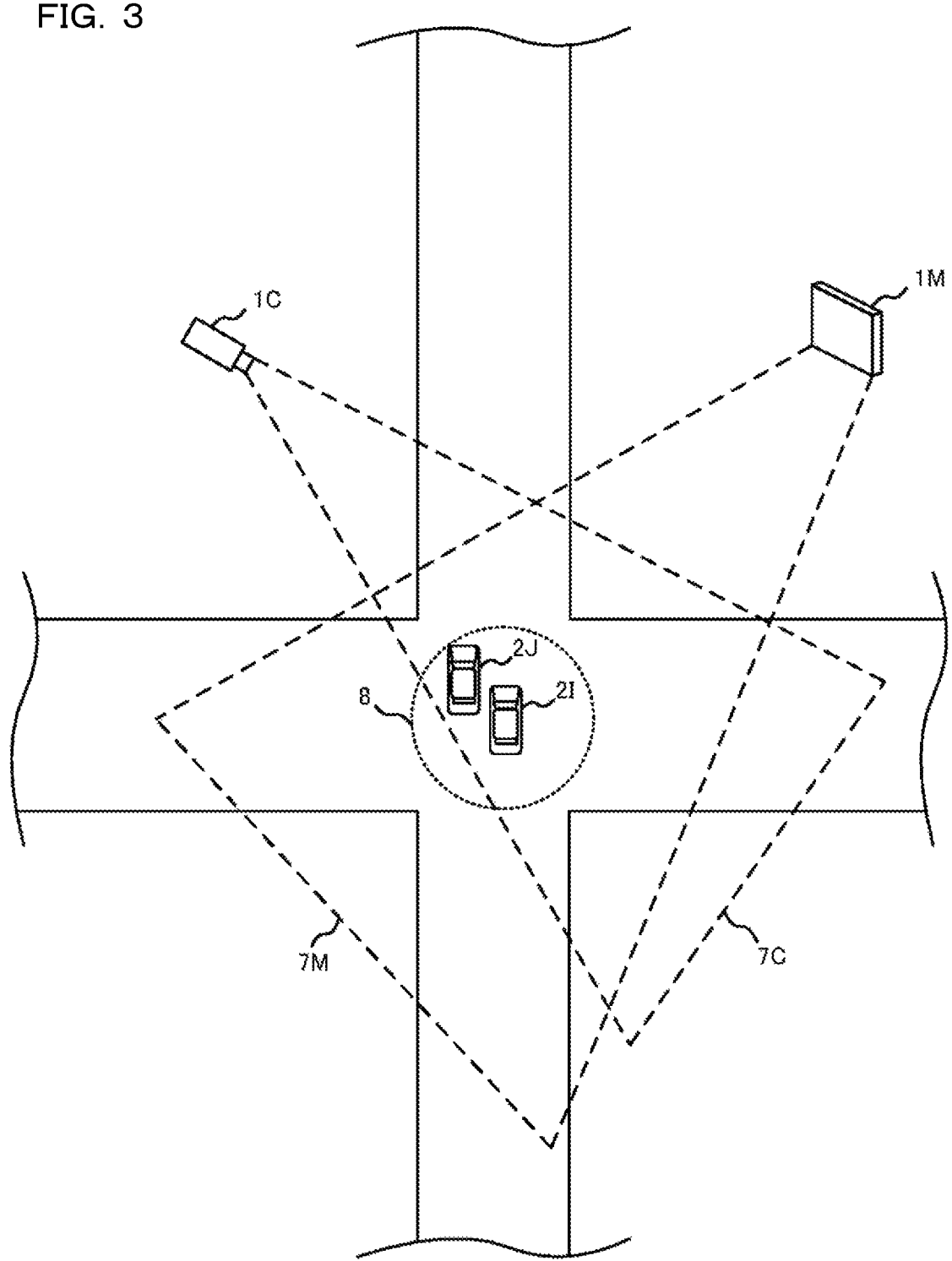
FIG. 3 is a view illustrating an example of sensor information that is acquired by a sensor information acquisition unit.

FIG. 3 is a view illustrating an example of sensor information that is acquired by the sensor information acquisition unit 52.

For example, it is assumed that a millimeter wave radar (hereinafter, referred to as "road-side millimeter wave radar") 1M and a camera (hereinafter, referred to as "road-side camera") 1C are installed on the road side as the road-side sensors 1. It is assumed that the road-side millimeter wave radar 1M monitors a detection target area 7M, and detects a vehicle 2I in a detection target area 7M. On the other hand, it is assumed that the road-side camera 1C monitors a detection target area 7C, and detects a vehicle 2J in the detection target area 7C. According to this, the sensor information acquisition unit 52 acquires sensor information including position information of the vehicle 2I from the road-side millimeter wave radar 1M, and acquires sensor information including position information of the vehicle 2J from the road-side camera 1C. Note that, the road-side sensors 1 are illustrated in FIG. 3, but an in-vehicle sensor may be employed. In addition, as the road-side sensors 1, the LiDAR, an ultrasonic sensor, and the like may be used.

The determination unit 53 of the control unit 51 determines whether or not each of a plurality of sensors detects an object that exists in the same predetermined area on the basis of sensor information that is acquired by the sensor information acquisition unit 52.

In the example illustrated in FIG. 3, in a case where an area 8 within a predetermined distance from the vehicle 2I is set as a predetermined area, the vehicles 2I and 2J in the area 8 are detected. According to this, the determination result by the determination unit 53 is positive. Note that, it is assumed that the predetermined distance is determined in consideration of a vehicle size so that single vehicle is basically included in the predetermined area, and the determination unit 53 determines whether or not one or a plurality of vehicles included in the predetermined area exist.

In a case where the determination result of the determination unit 53 is positive and a predetermined condition is not satisfied, the display information generation unit 54 of the control unit 51 generates first display information for separately displaying an object detected by each of the plurality of sensors. Here, the predetermined condition is a condition for determining a plurality of objects existing in the predetermined area (area 8) as the same object. Details of the predetermined condition will be described later. That is, in a case where a plurality of objects are detected in the predetermined area, and the plurality of objects are different objects, the display information generation unit 54 generates the first display information for respectively displaying the plurality of objects.

Figure 4A:
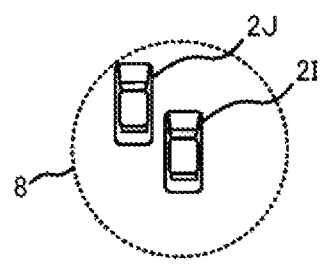
FIG. 4A is a view illustrating an example of first display information.

FIG. 4A is a view illustrating an example of the first display information. In the first display information, the vehicle 2I and the vehicle 2J are respectively displayed. Note that, in the first display information and second display information to be described later, for example, each vehicle is displayed as a vehicle icon.

On the other hand, in a case where the determination result of the determination unit 53 is positive and the predetermined condition is satisfied, the display information generation unit 54 generates second display information for displaying the object detected by each of the plurality of sensors in a display style different from a display style of the first display information. That is, in a case where a plurality of objects are detected in the predetermined area and the plurality of objects are the same object, the display information generation unit 54 generates the second display information for displaying the plurality of objects in a display style different from a display style of the first display information.

FIG. 4B to FIG. 4F are views illustrating an example of the second display information.

Figure 4B:
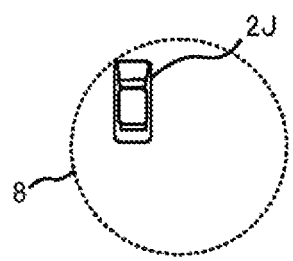
FIG. 4B is a view illustrating an example of second display information.

In second display information illustrated in FIG. 4B, among objects detected by the plurality of sensors, any one of objects is displayed. That is, in the second display information, the vehicle 2J between the vehicle 2I and the vehicle 2J which are illustrated with the first display information in FIG. 4A is selected and displayed. Note that, the vehicle 2I may be selected and displayed. An object that is a display target may be randomly selected, or may be selected in conformity to standards to be described below.

For example, the display information generation unit 54 may select any one of objects on the basis of types of a plurality of sensors. The camera or the LiDAR has high precision, but the millimeter wave radar has precision lower than the precision of the camera or the LiDAR. According to this, priority of sensors is determined in the order of high precision, and the display information generation unit 54 may select an object detected by a sensor having the highest priority. According to this, it is possible to display the object with high precision. Here, the server 5 may determine a sensor type from a sensor ID included in sensor information that is acquired by the sensor information acquisition unit 52 with reference to a table in which the sensor type and the sensor ID are correlated with each other. Note that, detection precision information of a sensor may be applied to the sensor information. According to this, the display information generation unit 54 can select an object corresponding to sensor information with priority given to sensor information with high detection precision on the basis of the detection precision information.

In addition, the display information generation unit 54 may select any one of the plurality of objects on the basis of an installation target of the plurality of sensors. The road-side sensor 1 installed on a road side or the like may have detection precision higher than that of an in-vehicle sensor that is installed in the vehicle 2. According to this, the display information generation unit 54 preferentially selects an object detected by the road-side sensor 1 in comparison to an object detected by the in-vehicle sensor. According to this, it is possible to display the object with high precision. Here, the server 5 may determine an installation target of a sensor from the sensor ID included in the sensor information that is acquired by the sensor information acquisition unit 52 with reference to a table in which the installation target of the sensor and the sensor ID are correlated with each other.

In addition, the display information generation unit 54 may select any one of plurality of objects on the basis of a distance from each sensor to an object detected by the sensor. The shorter the distance up to the object is, the higher detection precision of the sensor is. According to this, the display information generation unit 54 selects an object that is detected by a sensor of which a distance up to the object is the shortest. According to this, it is possible to display the object with high precision.

Figure 4C:
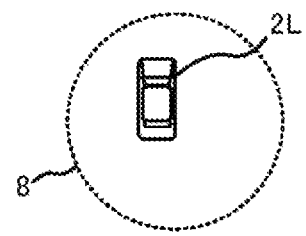
FIG. 4C is a view illustrating an example of the second display information.

In second display information illustrated in FIG. 4C, one object is displayed at an average position of objects detected by a plurality of sensors. That is, in the second display information, a vehicle 2L is displayed at an average position of the vehicle 2I and the vehicle 2J illustrated with the first display information in FIG. 4A. When averaging positions, it is possible to make a position of an object be closer to an accurate position. According to this, it is possible to display objects in the same number of actual objects at an accurate position.

Figure 4D:
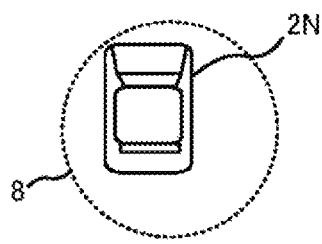
FIG. 4D is a view illustrating an example of the second display information.

In second display information illustrated in FIG. 4D, an object obtained by integrating objects which are detected by a plurality of sensors is displayed. That is, in the second display information, a vehicle 2N having a size covering the vehicle 2I and the vehicle 2J is displayed at positions of the vehicle 2I and the vehicle 2J illustrated with the first display information in FIG. 4A.

Figure 4E:
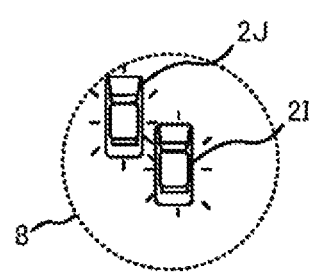
FIG. 4E is a view illustrating an example of the second display information.

In second display information illustrated in FIG. 4E, objects detected by a plurality of sensors are displayed while being flickered. That is, in the second display information, the vehicle 2I and the vehicle 2J illustrated with the first display information in FIG. 4A are displayed as flickering. According to this, it is possible to notify a user of a situation in which the vehicle 2I and the vehicle 2J are the same vehicle 2.

Figure 4F:
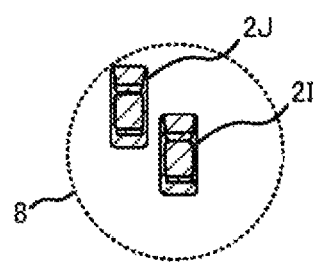
FIG. 4F is a view illustrating an example of the second display information.

In second display information illustrated in FIG. 4F, objects detected by a plurality of sensors are displayed in a color different from that of an object illustrated with the first display information. That is, in the second display information, the vehicle 2I and the vehicle 2J are displayed in a color different from a color of the first display information in FIG. 4A.

For example, the display information generation unit 54 creates second display information in at least one display style illustrated in FIG. 4B to FIG. 4F. Note that, the display information generation unit 54 may create the second display information in which the display styles are combined.

When receiving a display information request message from the in-vehicle device 3 of the vehicle 2 or a communication terminal of a user, the display information generation unit 54 distributes generated display information to the in-vehicle device 3 or the communication terminal which is a transmission source of the request message.

Next, description will be given of the predetermined condition for determining a plurality of objects existing in a predetermined area as the same object.

Figure 5:
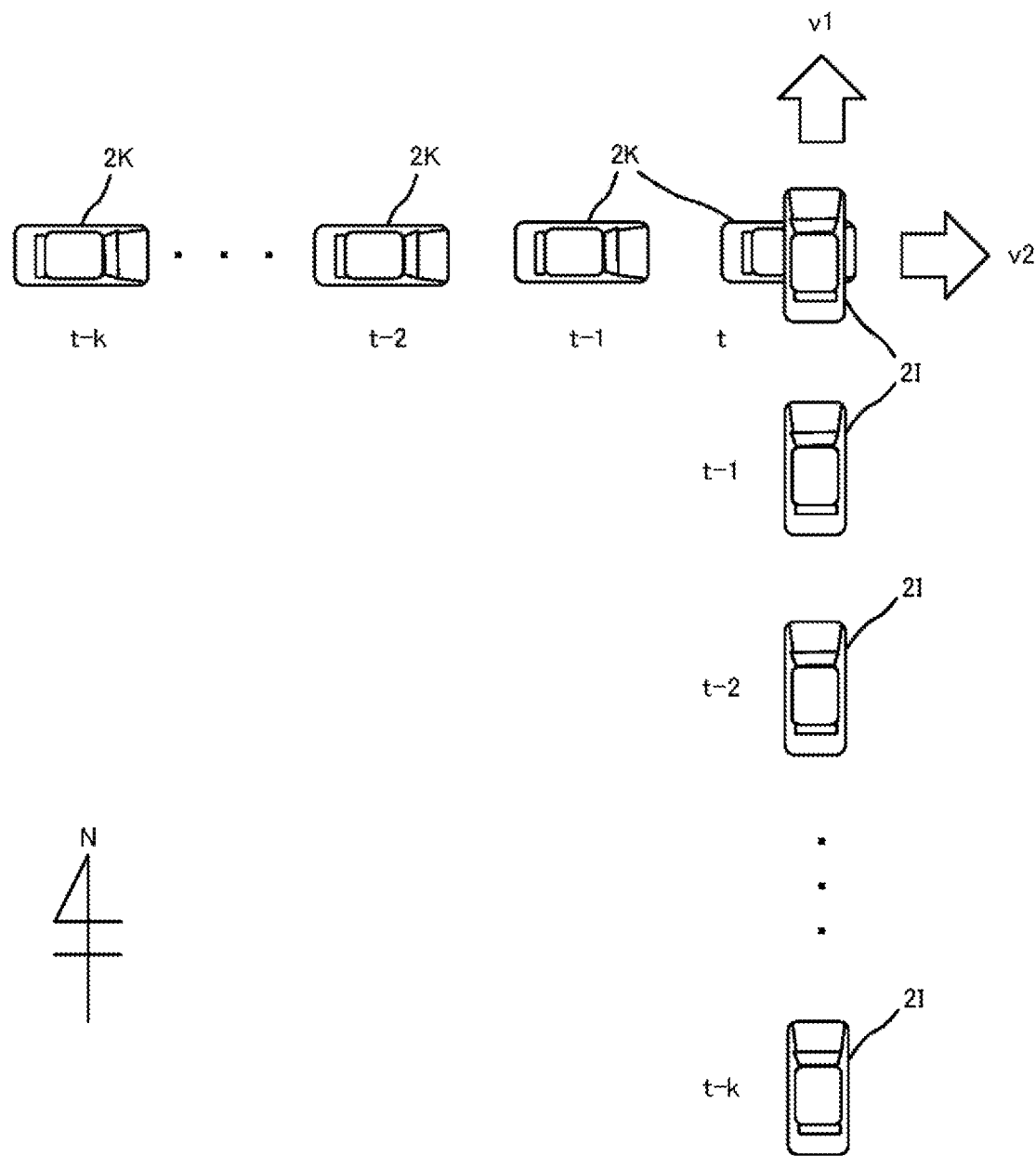
FIG. 5 is a view for describing predetermined conditions for determining a plurality of objects existing in a predetermined area as the same object.

FIG. 5 is a view for describing the predetermined condition for determining the plurality of objects existing in the predetermined area as the same object.

The predetermined condition includes a condition based on positions of objects detected by a plurality of sensors. For example, in a case where the plurality of objects are the same object, it is considered that positions of the plurality of objects match each other in the current time or in the past time. On the other hand, in a case where the plurality of objects are different objects, it is considered that even though current positions of the plurality of objects match each other, positions of the objects in the past time are different from each other. Therefore, in a case where positions of the plurality of objects match each other at a time before k seconds (k is a positive value) from a current time, the display information generation unit 54 determines that the plurality of objects are the same object, and in a case where the positions do not match each other, the display information generation unit 54 determines that the plurality of objects are different objects. Note that, even though the positions of the objects do not strictly match each other, in a case where a distance between the objects is equal to or less than a predetermined distance threshold value, the positions of the objects can be regarded to match each other. Note that, the distance threshold value is a positive value.

As illustrated in FIG. 5, it is assumed that a vehicle 2I is travelling toward a northern side, and a vehicle 2K is travelling toward an eastern side. In this case, positions of the vehicles match each other at a current time t, but positions of the vehicles are different from each other at a time (t−k) before k seconds from the current time t. Therefore, the display information generation unit 54 determines the vehicle 2K and the vehicle 2J are different vehicles.

The predetermined condition may include a condition in which a direction difference between the objects detected by the plurality of sensors is equal to or less than a predetermined angle threshold value. That is, in a case where the direction difference is equal to or less than a predetermined angle threshold value, the display information generation unit 54 determines that the plurality of objects are the same as each other, and in a case where the direction difference is greater than the predetermined angle threshold value, the display information generation unit 54 determines that the plurality of objects are different from each other. Note that, the angle threshold value is a positive value. In the example illustrated in FIG. 5, it is possible to determine that the vehicle 2I is travelling to a northern side from a position variation thereof, and the vehicle 2K is travelling to an eastern side from a position variation thereof. Therefore, a direction difference between the vehicles is approximately 90°. For example, in a case where the angle threshold value is set to 5°, the display information generation unit 54 determines that the vehicle 2K and the vehicle 2J are different vehicles.

The predetermined condition may include a condition in which a speed difference of the objects detected by the plurality of sensors is equal to or less than a predetermined speed threshold value. The speed of each of the objects is calculated on the basis of a distance between two sites of the object and a time. The speed threshold value is a positive value. In the example illustrated in FIG. 5, it is assumed that the speeds of the vehicle 2I and the vehicle 2K are calculated as v1 and v2. In a case where an absolute value of a difference between the speeds v1 and v2 is equal to or less than the predetermined speed threshold value, the display information generation unit 54 determines that the vehicles 2I and 2K are the same as each other, and in a case where the absolute value of the difference of the speeds is greater than the predetermined speed threshold value, the display information generation unit 54 determines that the vehicles 2I and 2K are different from each other.

The predetermined condition may include a condition based on at least one among a size, a color, and a shape of the objects detected by the plurality of sensors. For example, in a case where the sensors are cameras, it is possible to detect the size, the color, and the shape of the objects.

According to this, the predetermined condition may include a condition in which a size difference of objects detected by the plurality of sensors is equal to or less than a predetermined size threshold value. For example, in a case where a size of an object is set to the number of pixels of a region occupied by the object in an image, when a difference in the number of pixels of the region corresponding to the object is equal to or less than the predetermined size threshold value, the predetermined condition may be regarded to be satisfied.

In addition, the predetermined condition may include a condition in which a color difference of objects detected by the plurality of sensors is equal to or less than a predetermined color threshold value. For example, a difference of average values of luminance in respective colors of R, G, and B of objects is equal to or less than a color threshold value, the predetermined condition may be regarded to be satisfied.

In addition, the predetermined condition may include a condition in which shapes of objects detected by the plurality of sensors are similar. For example, in a case where a shape of an object in an image is approximated to a rectangle, the shape of the object is expressed by a ratio between a long side and a short side of the rectangle corresponding to the object. A difference of a plurality of the ratios corresponding to objects detected by the plurality of sensors is equal to or less than a predetermined ratio threshold value, the predetermined condition may be regarded to be satisfied.

When determining the predetermined condition by using the size, the color, or the shape of the object, it is possible to prevent a plurality of vehicles travelling in the same lane or a plurality of vehicles travelling in adjacent lanes from being erroneously determined as one vehicle. According to this, it is possible to accurately determine whether or not a plurality of objects existing in a predetermined area are the same object.

Note that, various threshold values such as the speed threshold value and the angle threshold value which are used when determining the above-described various predetermined conditions may be determined on the basis of types of a plurality of sensors. For example, the camera or the LiDAR has high precision, but the millimeter wave radar has precision lower than the precision of the camera or the LiDAR. Therefore, in a case where all of a plurality of sensors which detect an object are high-precision sensors (the camera or the LiDAR), the threshold value is set to a small value (a first threshold value), and in a case where a low-precision sensor (for example, the millimeter wave radar) is included in the plurality of sensors, the threshold value may be set to a large value (a second threshold value larger than the first threshold value). In this manner, when setting the threshold value in correspondence with the precision of the sensors, it is possible to accurately determine whether or not a plurality of objects existing in a predetermined area are the same object. Here, the server 5 may determine a sensor type from a sensor ID included in the sensor information acquired by the sensor information acquisition unit 52 with reference to a table in which the sensor type and the sensor ID are correlated with each other.

In addition, the above-described various threshold values may be determined on the basis of installation targets of the plurality of sensors. The road-side sensor 1 that is installed on the road side or the like may have detection precision higher than detection precision of the in-vehicle sensor installed in the vehicle 2 in many cases. Therefore, in a case where each of a plurality of the road-side sensors 1 detects an object, the threshold values are set to a small value (a first threshold value), and in a case where each of a plurality of the in-vehicle sensors detect an object, the threshold values are set to a large value (a second threshold value larger than the first threshold value). According to this, it is possible to precision determine whether or not a plurality of objects existing in a predetermined area are the same object. Here, the server 5 may determine an installation target of a sensor from the sensor ID included in the sensor information acquired by the sensor information acquisition unit 52 with reference to a table in which the installation target of the sensor and the sensor ID are correlated with each other.

In addition, the above-described various threshold values may be determined on the basis of detection precision of a plurality of sensors. In a case where all of the plurality of sensors which detect an object are sensors with high precision, the threshold values may be set to a small value (a first threshold value), and in a case where a sensor with low precision is included in the plurality of sensors, the threshold values may be set to a large value (a second threshold value larger than the first threshold value). According to this, it is possible to accurately determine whether or not a plurality of objects existing in a predetermined area are the same object. Here, the server 5 may determine detection precision of the sensor from the sensor ID included in the sensor information acquired by the sensor information acquisition unit 52 with reference to a table in which the detection precision of the sensor and the sensor ID are correlated with each other.

In addition, the above-described various threshold values may be determined on the basis of position precision of the plurality of sensors. The road-side sensor 1 installed on a road side or the like is fixed, and thus position precision thereof is higher than sensor position precision of the in-vehicle sensor installed in the vehicle 2. An absolute position of an object can be defined by an absolute position of a sensor and a relative position from the sensor to the object. According to this, in a case where detection precision of the absolute position of the sensor is low, detection precision of the absolute position of the object is also lowered. That is, the higher the position precision of the sensor is, the higher the detection precision of the absolute position of the object becomes. Accordingly, in a case where the position precision of all of the plurality of sensors which detects an object is high, the threshold values may be set to a small value (a first threshold value), and in a case where a sensor with low position precision is included in the plurality of sensors, the threshold values may be set to a large value (a second threshold value larger than the first threshold value). According to this, it is possible to accurately determine whether or not a plurality of objects existing in a predetermined area are the same object. Here, the server 5 may determine the position precision of the sensor from the sensor ID included in the sensor information acquired by the sensor information acquisition unit 52 with reference to a table in which the position precision of the sensor and the sensor ID are correlated with each other. In addition, as to be described later, position precision information of the sensor may be included in the sensor information.

[Configuration of In-Vehicle Device]

Figure 6:
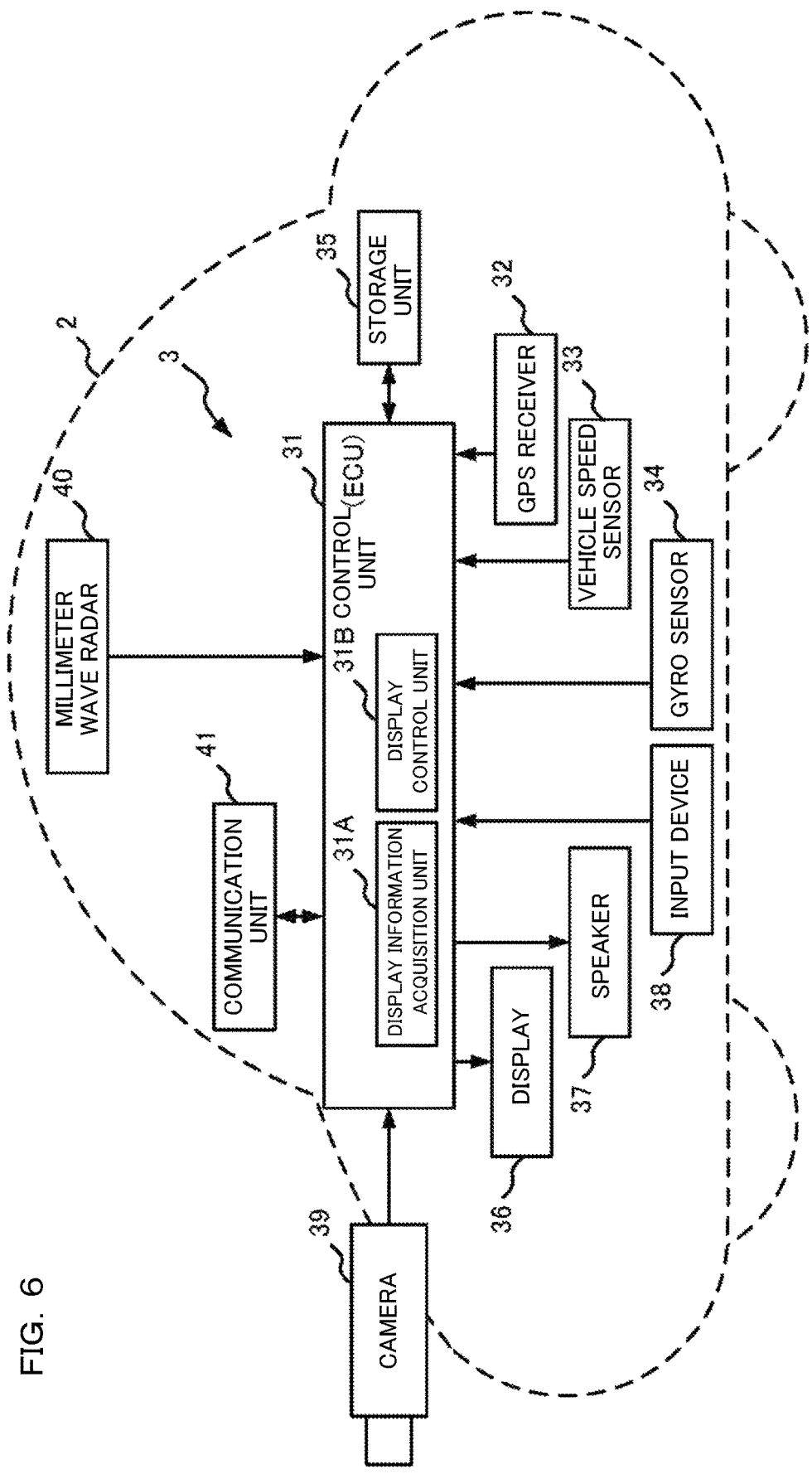
FIG. 6 is a block diagram illustrating an example of a configuration of an in-vehicle device.

FIG. 6 is a block diagram illustrating an example of a configuration of the in-vehicle device 3.

As illustrated in FIG. 6, the in-vehicle device 3 of the vehicle 2 includes an electronic control unit (ECU) 31, a global positioning system (GPS) receiver 32, a vehicle speed sensor 33, a gyro sensor 34, a storage unit 35, a display 36, a speaker 37, an input device 38, a camera 39, a millimeter wave radar 40, and a communication unit 41.

For example, the communication unit 41 is constituted by a radio communication device capable of performing a communication process corresponding to 5G. Note that, the communication unit 41 may be a radio communication device that is installed in a vehicle 2 in advance, or a portable terminal that is taken into the vehicle 2 by an occupant.

When being connected to a vehicle interior local area network (LAN) of the vehicle 2, the portable terminal of the occupant temporarily becomes an in-vehicle radio communication device.

The control unit 31 is constituted by a computer device that performs route retrieval of the vehicle 2, control of other electronic devices 32 to 41, and the like. The control unit 31 obtains a vehicle position of a host vehicle by a GPS signal that is periodically acquired by the GPS receiver 32. Note that, the control unit 31 may complement the GPS signal or correct the vehicle position of the host vehicle by using a GPS complementation signal or a GPS reinforcement signal that is received by a receiver that receives a signal transmitted from a quasi-zenith satellite (not illustrated) in combination.

The control unit 31 complements a vehicle position and a direction on the basis of an input signal from the vehicle speed sensor 33 and the gyro sensor 34, and understands correct current position and direction of the vehicle 2.

The GPS receiver 32, the vehicle speed sensor 33, and the gyro sensor 34 are sensors which measure a current position, a speed, and a direction of the vehicle 2.

The storage unit 35 includes a map database. The map database provides road map data to the control unit 31. The road map data includes link data or node data and is accommodated in a recording medium such as a DVD, a CD-ROM, a memory card, and an HDD. The storage unit 35 reads out necessary road map data from the recording medium, and provides the road map data to the control unit 31.

The display 36 and the speaker 37 is an output device that notifies various pieces of information generated by the control unit 31 to a user who is an occupant of the vehicle 2.

Specifically, the display 36 displays an input screen in route retrieval, a nearby map image of a host vehicle, route information up to a destination, and the like. The speaker 37 outputs announcement or the like for guiding the vehicle 2 to the destination with a voice. The output devices may notify the occupant of providing information received by the communication unit 41.

The input device 38 is a device that is used by the occupant of the vehicle 2 to perform various input operations. The input device 38 is constituted by a combination of an operation switch installed in a handle, a joy stick, a touch panel installed in the display 36, and the like.

A voice recognition device that receives an input by voice recognition of the occupant may be set as the input device 38. An input signal generated by the input device 38 is transmitted to the control unit 31.

The camera 39 includes an image sensor that receives an image in front of the vehicle 2. The camera 39 may be a monocular camera or a multi-eye camera. The millimeter wave radar 40 includes a sensor that detects an object that exists in front of the vehicle 2 or at the periphery of the vehicle 2. Note that, various sensors such as a LiDAR, a laser radar, and an ultrasonic radar can be used instead of the millimeter wave radar 40 or in combination with the millimeter wave radar 40.

The control unit 31 may cause the display 36 to output attention attraction with respect to the occupant in driving or may execute drive assisting control such as forced brake intervention on the basis of measurement data obtained by the camera 39 and the millimeter wave radar 40, or sensor information acquired from the server 5.

The control unit 31 is constituted by an operation processing unit such as a microcomputer that executes various control programs stored in the storage unit 35.

The control unit 31 can execute various navigation functions such as a function of assisting safe drive of the vehicle 2, a function causing the display 36 to display a map image, a function of calculating a route from a departure area to a destination (in a case where a relay exist, the route includes a position thereof), and a function of guiding the vehicle 2 to the destination along a calculated route by executing the control program.

The control unit 31 capable of performing a recognition process of recognizing an object in front of the host vehicle or at the periphery of the host vehicle and a distance measurement process of calculating a distance up to the recognized object on the basis of measurement data of at least one of the camera 39 and the millimeter wave radar 40.

The control unit 31 can calculate position information of the object that is recognized by the recognition process from the distance calculated by the distance measurement process and a sensor position of the host vehicle.

The control unit 31 includes a display information acquisition unit 31A and a display control unit 31B, and can execute the following processes in communication with the server 5.

1) Request message transmission process
2) Display information reception process
3) Communication packet transmission process The request message transmission process is a process in which the display information acquisition unit 31A transmits a control packet, which makes for making a request for distribution of display information generated by the server 5, to the server 5. A vehicle ID of the host vehicle is included in the control packet.

When receiving the request message including a predetermined vehicle ID, the server 5 distributes display information to the communication unit 41 of the vehicle 2 having a vehicle ID of a transmission source in a predetermined distribution period.

The display information reception process is a process in which the display information acquisition unit 31A receives the display information distributed to the host vehicle by the server 5.

The display control unit 31B executes a process of causing the display 36 to display the received display information.

For example, the display control unit 31B causes the display 36 to display the received display information in a state of being superimposed on a map image.

The communication packet transmission process in the vehicle 2 is a process of transmitting a communication packet including sensor information indicating an object detection result by the camera 39 or the millimeter wave radar 40 to the server 5. The communication packet transmission process is performed within a display information distribution period by the server 5.

In addition to position information of an object (latitude information and longitude information of the object), distance information from the vehicle 2 (the camera 39 or the millimeter wave radar 40) up to the object, position information of the vehicle 2 (latitude information and longitude information of the vehicle 2), speed information of the vehicle 2, direction information of the vehicle 2, position precision of a sensor, and the like are included in the sensor information. The position precision information of the sensor is information indicating position precision of the vehicle 2. For example, the position precision information of the sensor is determined by (a) to (g) to be described below, and the like.

(a) Presence or absence of DR (autonomous navigation, position correction by a vehicle speed pulse or a back signal of the gyro sensor 34, the vehicle speed sensor 33, or the like)

(b) Presence or absence of correction by map matching (c) Precision of road map data stored in the storage unit 35

(d) Number of GPS satellites used when obtaining a position of the vehicle 2

(e) C/NO of the GPS receiver 32 (carrier noise power density ratio)

(f) GPS quality (g) Position dilution of precision (PDOP)

The control unit 31 transmits the communication packet including the vehicle ID of the host vehicle to the server 5.

[Configuration Road-Side Sensor]

Figure 7:
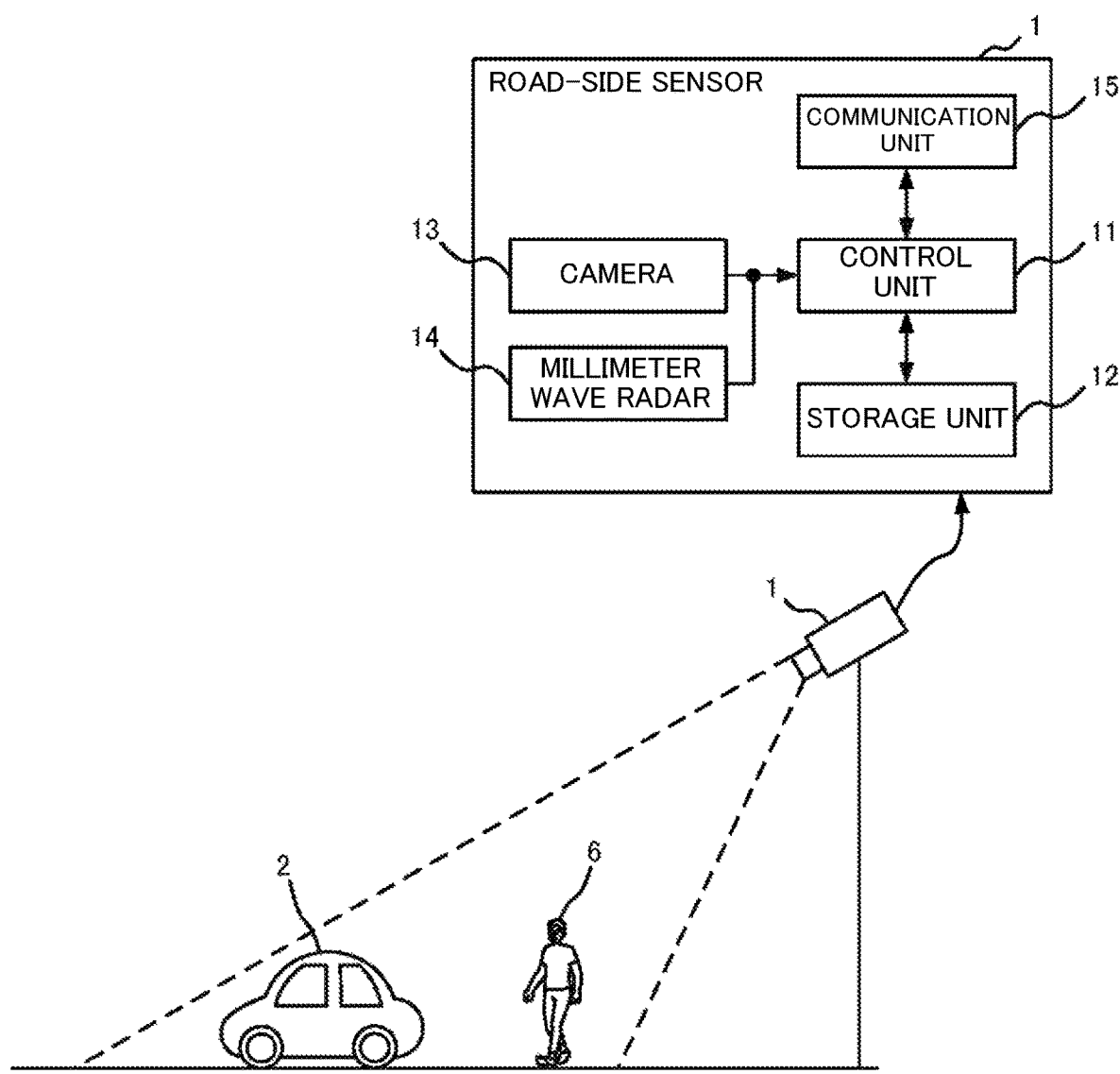
FIG. 7 is a block diagram illustrating an example of a configuration of a road-side sensor.

FIG. 7 is a block diagram illustrating an example of a configuration of the road-side sensor 1.

As illustrated in FIG. 7, the road-side sensor 1 includes a control unit 11, a storage unit 12, a camera 13, a millimeter wave radar 14, and a communication unit 15.

For example, the communication unit 15 is constituted by a radio communication device capable of performing a communication process conforming to 5G.

Accordingly, the road-side sensor 1 can perform communication with the server 5.

The control unit 11 includes a CPU, a ROM, a RAM, and the like. The control unit 11 reads out and executes a program stored in the storage unit 12, and controls an overall operation of the road-side sensor 1.

The storage unit 12 is constituted by a hard disk, a nonvolatile memory, or the like, and stores various computer programs or date. The storage unit 12 stores the sensor ID that is identification information of the road-side sensor 1. For example, the sensor ID includes an owner-specific user ID of the road-side sensor 1, a MAC address, or the like.

The camera 13 includes an image sensor that receives an image of a predetermined imaging area. The camera 13 may be a monocular camera or a multi-eye camera. The millimeter wave radar 14 includes a sensor that detects an object that exists in front of the millimeter wave radar 14 or at the periphery of the millimeter wave radar 14. Note that, various sensors such as a LiDAR, a laser radar, and an ultrasonic radar can be used instead of the millimeter wave radar 14 or in combination with the millimeter wave radar 14.

In addition, road-side sensor 1 may be provided with any one of the camera 13 or the millimeter wave radar 14.

The control unit 11 can perform a recognition process of recognizing an object in an imaging area and a distance measurement process of calculating a distance up to the recognized object on the basis of measurement data of at least one of the camera 13 and the millimeter wave radar 14.

The control unit 11 can calculate position information of the object that is recognized by the recognition process from the distance calculated by the distance measurement process and a sensor position of the host vehicle.

The control unit 11 can execute a communication packet transmission process in communication with the server 5.

The communication packet transmission process by the road-side sensor 1 is a process of transmitting a communication packet including sensor information indicating an object detection result by the camera 13 or the millimeter wave radar 14 to the server 5. The communication packet transmission process is performed within a display information distribution period by the server 5.

Position information (latitude information and longitude information) of the object, distance information from the road-side sensor 1 up to the object, and the like are included in the sensor information.

The control unit 11 transmits the communication packet including the sensor ID to the server 5.

[Display Information Distribution Process]

Figure 8:
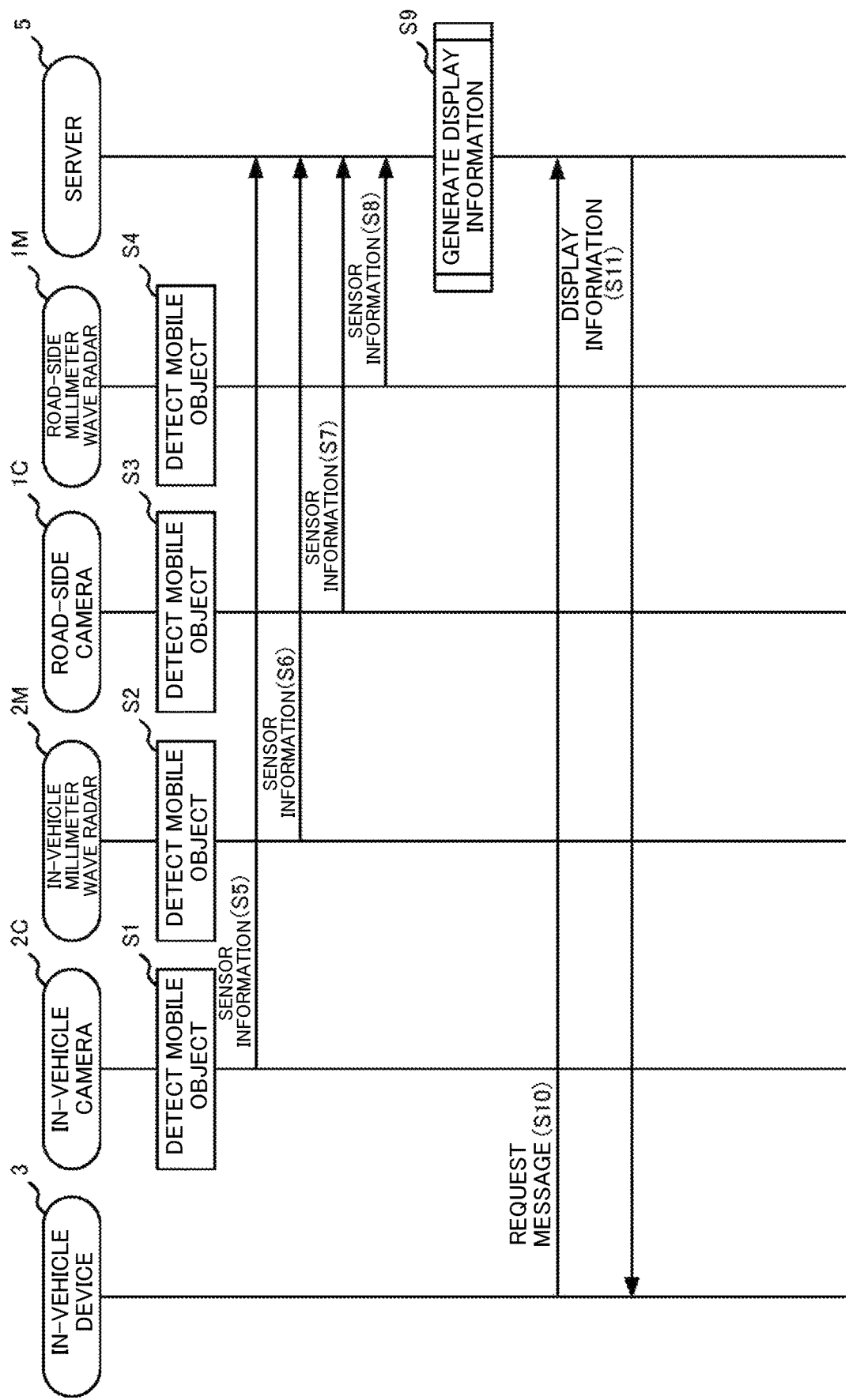
FIG. 8 is a sequence diagram illustrating an example of a distribution process of display information that is executed in cooperation of the in-vehicle device, an in-vehicle camera, an in-vehicle millimeter wave radar, a road-side camera, a road-side millimeter wave radar, and a server.

FIG. 8 is a sequence diagram illustrating an example of display information distribution process that is executed by cooperation of the in-vehicle device 3, an in-vehicle camera 2C, an in-vehicle millimeter wave radar 2M, the road-side camera 1C, the road-side millimeter wave radar 1M, and the server 5. When repeating the sequence illustrated in FIG. 8 at a predetermined interval (for example, an interval of 100 msec), a safe drive assisting function is selected and distributed at a predetermined interval.

Here, the in-vehicle device 3 represents an in-vehicle device that is installed in the vehicle 2 that is provided with display information. The in-vehicle camera 2C represents the in-vehicle device 3 including the camera 39. The in-vehicle millimeter wave radar 2M represents the in-vehicle device 3 including the millimeter wave radar 40. The road-side camera 1C represents the road-side sensor 1 including the camera 13. The road-side millimeter wave radar 1M represents the road-side sensor 1 including the millimeter wave radar 14. The sensors are illustrative only, and any one sensor may not be included or other sensors may be included.

Hereinafter, description will be given on the assumption that an object detected by each sensor is a mobile object, but the detection object may be a stationary object.

The in-vehicle camera 2C of the vehicle 2 detects a mobile object such as another vehicle 2 that travels in front of the vehicle 2 including the in-vehicle camera 2C or at the periphery of the vehicle 2, and a pedestrian 6 on the basis of image data captured by the camera 39 (S1).

The in-vehicle millimeter wave radar 2M of the vehicle detects a mobile object such as another vehicle 2 that travels in front of the vehicle 2 including the millimeter wave radar 40 or at the periphery of the vehicle 2, and the pedestrian 6 on the basis of measurement data of the millimeter wave radar 40 (S2).

The road-side camera 1C detects a mobile object such as another vehicle 2 that travels in front of the road-side camera 1C or at the periphery of the road-side camera 1C, and the pedestrian 6 on the basis of an image data captured by the camera 13 (S3).

The road-side millimeter wave radar 1M detects a mobile object such as another vehicle 2 that travels in front of the road-side millimeter wave radar 1M or at the periphery of the road-side millimeter wave radar 1M, and the pedestrian 6 on the basis of measurement data of the millimeter wave radar 14 (S4).

The in-vehicle camera 2C transmits a communication packet that includes sensor information including a detection result of the mobile object to the server 5 (S5). The server 5 receives the communication packet transmitted from the in-vehicle camera 2C.

The in-vehicle millimeter wave radar 2M transmits a communication packet that includes sensor information including a detection result of the mobile object to the server 5 (S6). The server 5 receives the communication packet transmitted from the in-vehicle millimeter wave radar 2M.

The road-side camera 1C transmits a communication packet that includes sensor information including a detection result of the mobile object to the server 5 (S7). The server 5 receives the communication packet transmitted from the road-side camera 1C.

The road-side millimeter wave radar 1M transmits a communication packet that includes sensor information including a detection result of the mobile object to the server 5 (S8). The server 5 receives the communication packet transmitted from the road-side millimeter wave radar 1M.

The server 5 generates display information indicating the mobile object detected by each of the sensors on the basis of the sensor information included in the communication packet that is received from each of the in-vehicle camera 2C, the in-vehicle millimeter wave radar 2M, the road-side camera 1C, and the road-side millimeter wave radar 1M (S9). A generation process (step S9) of the display information (first display information, second display information, or third display information to be described later) will be described later.

The in-vehicle device 3 transmits a control packet that makes a request for distribution of the display information to the server 5 as the request message (S10).

The server 5 receives the request message from the in-vehicle device 3, and transmits the display information generated in the display information generation process (step S9) to the in-vehicle device 3 that is a transmission source of the request message (S11). The in-vehicle device 3 of the vehicle 2 receives the display information, and executes a process for causing the display 36 to display the received display information.

[Display Information Generation Process (Step S9 in FIG. 8)]

Details of the display information generation process (step S9 in FIG. 8) will be described.

Figure 9:
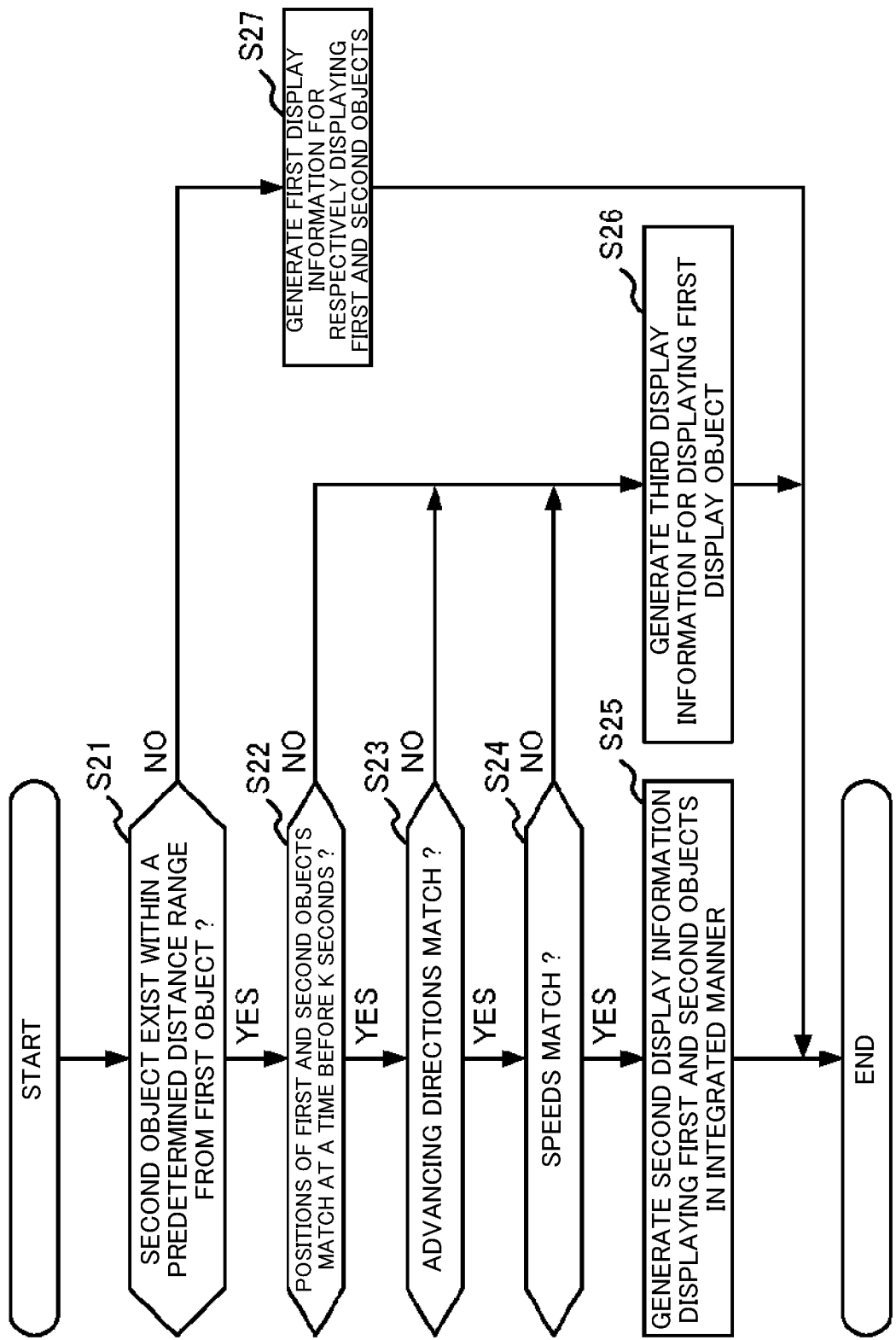
FIG. 9 is a flowchart illustrating details of a display information generation process (step S9 in FIG. 8)

FIG. 9 is a flowchart illustrating details of the display information generation process (step S9 in FIG. 8).

When referring to FIG. 9, the determination unit 53 of the server 5 determines whether or not a mobile object (hereinafter, referred to as "second object") detected by another sensor exists within a predetermined distance range from a mobile object (hereinafter, referred to as "first object") detected by an arbitrary sensor on the basis of the sensor information acquired by the sensor information acquisition unit 52 (S21). In a case where the first object is set as the vehicle 2I and the predetermined distance range is set as the area 8 with reference to FIG. 3, the vehicle 2J that is the second object exists within the predetermined distance range from the first object.

In a case where a determination result in step S21 is positive (YES in S21), the display information generation unit 54 determines whether or not positions of the first object and the second object match each other at a time before k seconds (k is a positive value) from a current time (S22). That is, the display information generation unit 54 determines that positions of both the objects match each other in a case where a distance between the first object and the second object before k seconds from the current time is equal to or less than a predetermined distance threshold value, and determines that the positions of both the objects do not match each other in a case where the distance is greater than the distance threshold value. FIG. 5 illustrates the vehicle 2K and the vehicle 2I of which positions before k seconds do not match each other.

In a case where the positions of the first object and the second object before k seconds match each other (YES in S22), the display information generation unit 54 determines whether or not advancing directions of the first object and the second object match each other (S23). That is, the display information generation unit 54 determines that the advancing directions match each other in a case where a direction difference between the first object and the second object is equal to or less than a predetermined angle threshold value, and determines that the advancing directions do not match each other in a case where the direction difference is greater than the angle threshold value. FIG. 5 illustrates the vehicle 2K and the vehicle 2I of which advancing directions do not match each other.

In a case where the advancing directions of the first object and the second object match each other (YES in S23), the display information generation unit 54 determines whether or not speeds of the first object and the second object match each other (S24). That is, the display information generation unit 54 determines that the speeds of both the objects match each other in a case where an absolute value of a speed difference between the first object and the second object is equal to or less than a predetermined speed threshold value, and determines that the speeds of both the objects are different from each other in a case where the absolute value of the speed difference between both the objects is greater than the speed threshold value (S24).

In a case where the speeds of the first object and the second object match each other (YES in S24), the display information generation unit 54 determines that the first object and the second object are the same object, and generates the second display information for displaying the first object and the second object in an integrated manner (S25). Examples of the second display information includes styles illustrated in FIG. 4B to FIG. 4D. Note that, the second display information may be display information for displaying the first object and the second object without integration as illustrated in FIG. 4E or FIG. 4F.

In a case where a determination result of any one of steps S22 to S24 is negative (NO in S22, NO in S23, or NO in S24), the display information generation unit 54 determines that the first object and the second object are different mobile objects, and generates the first display information for respectively displaying the first object and the second object (S26). Examples of the first display information include an style illustrated in FIG. 4A.

In a case where the second object does not exist within the predetermined distance range from the first object (NO in S21), the display information generation unit 54 generate third display information for displaying a first display object (S27).

Effects of Embodiment

As described above, according to the embodiment of the invention, in a case where each of a plurality of sensors detects an object that exists in a predetermined area, it is possible to change a display style of the object between the case of a predetermined condition is satisfied and a case where the predetermined condition is not satisfied. For example, in a case where a plurality of objects are different objects, the plurality of objects are separately displayed, and in a case where the plurality of objects are the same object, the plurality of objects are displayed in a display style different from the above-described display. According to this, a user can understand that the plurality of objects are objects determined as different objects or objects determined as the same object. According to this, it is possible to generate appropriate display information from a plurality of pieces of sensor information.

Modification Example

Note that, in the above-described embodiment, the position of the object detected by the sensor is not limited, but the position of the object may be limited.

That is, on the basis of a position relationship between each sensor and an object detected by the sensor, the determination unit 53 of the server 5 may determine whether or not to set the detected object as a determination target.

Figure 10:
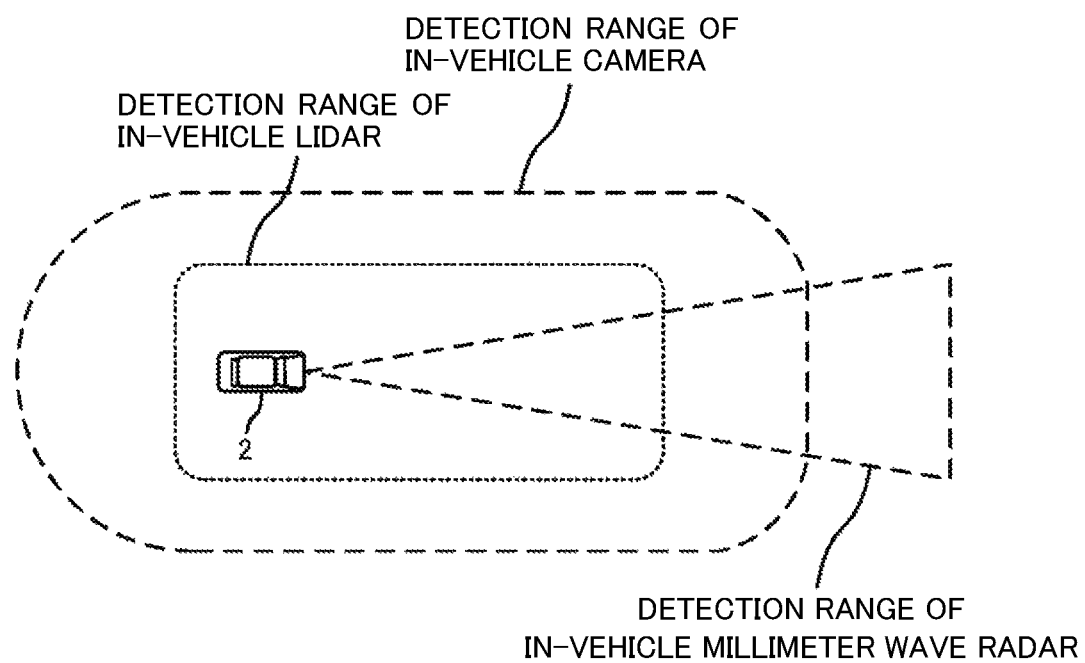
FIG. 10 is a view illustrating determination standards as to whether or not to set an object as a determination target.

FIG. 10 is a view illustrating a determination standard as to whether or not to set an object as a determination target.

A detection range of an in-vehicle camera, a detection range of an in-vehicle millimeter wave radar, and a detection range of an in-vehicle LiDAR as illustrated in FIG. 10 represent ranges in which object detection precision by sensors is high. That is, the sensors can detect an object out of the detection ranges, but object detection precision is low in a range out of the detection ranges. Note that, the detection ranges illustrated in FIG. 10 are illustrative only, and vary in accordance with detection precision of the sensors. For example, it is assumed that a detection range of an in-vehicle camera of 8K is wider than an in-vehicle camera of 4K.

When referring to FIG. 10, in a case where an object detected by the in-vehicle millimeter wave radar is included in the detection range of the in-vehicle millimeter wave radar which is set to a forward side of the in-vehicle millimeter wave radar, the determination unit 53 sets the object as a determination target, and in a case where the object is not included in the detection range, the determination unit 53 excludes the object from the determination target.

In addition, in a case where an object detected by the in-vehicle camera is included in the detection range of the in-vehicle camera which is set to a forward side of the in-vehicle camera or the periphery of the in-vehicle camera, the determination unit 53 sets the object as a determination target, and in a case where the object is not included in the detection range, the determination unit 53 excludes the object from the determination target.

In addition, in a case where an object detected by the in-vehicle LiDAR is included in the detection range of the in-vehicle LiDAR which is set to a forward side of the in-vehicle LiDAR or the vicinity of the in-vehicle LiDAR, the determination unit 53 sets the object as a determination target, and in a case where the object is not included in the detection range, the determination unit 53 excludes the object from the determination target.

According to this, the determination unit 53 sets only an object for which detection precision is high as a determination target, and in a case where another object exists within a predetermined distance from the object that is set as the determination target, the determination unit 53 makes a determination as to whether or not both the objects are the same as each other.

According to this modification example, only in a case where a distance up to an object is short, it is possible to determine whether or not a plurality of objects existing in a predetermined area are the same objects. According to this, it is possible to allow a determination process to be performed with respect to an object for which detection precision is high without performing the determination process with respect to an object which is located far from a sensor and for which detection precision is low. According to this, it is possible to enhance reliability of the determination process, and it is possible to accurately determine whether or not a plurality of objects existing in a predetermined area are the same object.

Note that, in FIG. 10, the detection ranges of the in-vehicle sensors are illustrated, but a detection range of a road-side sensor is set in a similar manner. Accordingly, the determination unit 53 can determine whether or not to set an object detected by the road-side sensor as a determination target in a similar process as the case of the in-vehicle sensor.

Hereinbefore, description has been given of the radio communication system according to the embodiment of the invention, but the invention is not limited to the embodiment.

For example, the above-described radio communication system can be realized by an information generation device described in Additional Statement 1.

[Additional Statement 1]

An information generation device including:

a sensor information acquisition unit that acquires sensor information indicating a measurement result of a detection target area from each sensor;

a determination unit that determines whether or not each of a plurality of the sensors detects an object existing in the same predetermined area on the basis of the sensor information acquired by the sensor information acquisition unit; and a display information generation unit that generates first display information for separately displaying the object that is detected by each of the plurality of sensors in a case where a determination result of the determination unit is positive and a predetermined condition for determining whether or not a plurality of the objects detected by the plurality of sensors are the same object is not satisfied, and generates second display information for displaying the object detected by each of the plurality of sensors in a display style different from a display style of the first display information in a case where the determination result is positive and the predetermined condition is satisfied, in which the second display information includes information for displaying the object detected by each of the plurality of sensors in a color different from a color of the object expressed by the first display information.

In addition, in the above-described embodiment, the display information generation unit 54 determines whether or not a plurality of objects existing in a predetermined area are the same object by determining whether or not the predetermined condition is satisfied. However, the determination unit 53 may determine whether or not the predetermined condition is satisfied instead of the display information generation unit 54.

In addition, parts or all of constituent elements of each device described above may be constituted by one system LSI. The system LSI is an ultra-multi-functional LSI manufactured by integrating a plurality of constituent units on one chip, and specific examples thereof include a computer system including a microprocessor, a ROM, a RAM, and the like. A computer program is stored in the RAM. When the microprocessor operates in accordance with the computer program, the system LSI accomplishes the function.

In addition, the invention may be set as a method as described above. In addition, the invention may be set as a computer program that realizes the method by a computer.

In addition, the invention may be set as a computer-readable non-transitory recording medium such as an HDD, a CD-ROM, and a semiconductor memory which record the computer program.

In addition, the invention may be set as a configuration in which the computer program is transmitted through an electric communication line, wireless or wired communication line, a network represented by the Internet, data broadcasting, or the like.

In addition, at least parts of the embodiment and the modification example may be combined in an arbitrary manner.

It should be understood that the embodiment disclosed here is illustrative only in all styles, and is not limited. In addition, it should be understood that the scope of the invention is described in the appended claims instead of the above-described meaning, and includes all modifications within meaning and a range equivalent to the appended claims.

It is to be noted that, as used herein and in the appended claims, the singular forms "a", "an", and "the" include plural referents unless the context clearly dictates otherwise.

The invention claimed is:

1. An information generation device comprising:
   a processor
   that acquires sensor information indicating a measurement result of a detection target area from each of a plurality of sensors having the detection target area that is common to the plurality of sensors,
   that determines whether or not each of the plurality of sensors detects an object existing in the same predetermined area on the basis of a plurality of pieces of the sensor information acquired, and
   that generates first display information for separately displaying the object that is detected by each of the plurality of sensors in a case where a determination result is positive and a predetermined condition for determining whether or not a plurality of the objects detected by the plurality of sensors are the same object is not satisfied, and generates second display information for displaying the object detected by each of the plurality of sensors in a display style different from a display style of the first display information in a case where the determination result is positive and the predetermined condition is satisfied, wherein
   the second display information includes information for displaying an object having a size covering the plurality of objects detected by each of the plurality of sensors.

2. The information generation device according to claim 1, wherein
   an area within a predetermined distance from an object position based on sensor information obtained from any one of the plurality of sensors is set as the predetermined area.

3. The information generation device according to claim 1, wherein
   the second display information includes information for displaying any one of objects detected by each of the plurality of sensors.

4. The information generation device according to claim 3, wherein
   the processor generates the second display information for displaying the object that is selected by selecting the any one of the objects on the basis of a type of the plurality of sensors.

5. The information generation device according to claim 3, wherein
   the processor generates the second display information for displaying the object that is selected by selecting the any one of the objects on the basis of an installation target of the plurality of sensors.

6. The information generation device according to claim 3, wherein
   the processor generates the second display information for displaying the object that is selected by selecting the any one of the objects on the basis of a distance from each of the sensors up to the object that is detected by each of the sensors.

7. The information generation device according to claim 1, wherein
   the second display information includes information for displaying the object that is detected by each of the plurality of sensors as the object flickering.

8. The information generation device according to claim 1, wherein
   the predetermined condition includes a condition based on a position of the object detected by each of the plurality of sensors.

9. The information generation device according to claim 1, wherein
   the predetermined condition includes
   a condition in which a distance between the plurality of objects which is obtained based on an object position detected by the plurality of sensors at a predetermined time in the past is equal to or less than a predetermined distance threshold value;
   a condition in which a direction difference between the plurality of objects detected by the plurality of sensors is equal to or less than a predetermined angle threshold value; or
   a condition in which a speed difference between the plurality of objects detected by the plurality of sensors is equal to or less than a predetermined speed threshold value.

10. The information generation device according to claim 9, wherein
    the threshold value is determined on the basis of a type of the plurality of sensors.

11. The information generation device according to claim 9, wherein
    the threshold value is determined on the basis of an installation target of the plurality of sensors.

12. The information generation device according to claim 9, wherein
    the threshold value is determined on the basis of detection precision of the plurality of sensors.

13. The information generation device according to claim 9, wherein
the threshold value is determined on the basis of position precision of the plurality of sensors.

14. The information generation device according to claim 1, wherein
the predetermined condition includes a condition based on at least any one of a size, a color, and a shape of the object that is detected by each of the plurality of sensors.

15. The information generation device according to claim 1, wherein
the processor determines whether or not to set the object as a determination target on the basis of a position relationship between each of the sensors and the object detected by each of the sensors.

16. An information generation method comprising:
a step of acquiring sensor information indicating a measurement result of a detection target area from each of a plurality of sensors having the detection target area that is common to the plurality of sensors;
a step of determining whether or not each of the plurality of sensors detects an object existing in the same predetermined area on the basis of a plurality of pieces of the acquired sensor information; and
a step of generating first display information for separately displaying the object that is detected by each of the plurality of sensors in a case where a determination result in the determining step is positive and a predetermined condition for determining whether or not a plurality of the objects detected by the plurality of sensors are the same object is not satisfied, and generating second display information for displaying the object detected by each of the plurality of sensors in a display style different from a display style of the first display information in a case where the determination result is positive and the predetermined condition is satisfied, wherein
the second display information includes information for displaying an object having a size covering the plurality of objects detected by each of the plurality of sensors.

17. A non-transitory computer-readable recording medium recording a computer program for causing a computer to acquire sensor information indicating a measurement result of a detection target area from each of a plurality of sensors having the detection target area that is common to the plurality of sensors;
to determine whether or not each of the plurality of sensors detects an object existing in the same predetermined area on the basis of a plurality of pieces of the sensor information acquired;
to generate first display information for separately displaying the object that is detected by each of the plurality of sensors in a case where a determination result is positive and a predetermined condition for determining whether or not a plurality of the objects detected by the plurality of sensors are the same object is not satisfied; and
to generate second display information for displaying the object detected by each of the plurality of sensors in a display style different from a display style of the first display information in a case where the determination result is positive and the predetermined condition is satisfied, wherein
the second display information includes information for displaying an object having a size covering the plurality of objects detected by each of the plurality of sensors.

18. An in-vehicle device comprising: a processor
that acquires at least one piece of display information between the first display information and the second display information from the information generation device according to claim 1, the first display information and the second display information being generated by the information generation device; and
that controls display on a screen based on the display information acquired.

19. The information generation device according to claim 1, wherein
the predetermined condition includes
a condition in which an advancing direction difference between the plurality of objects detected by the plurality of sensors is equal to or less than a predetermined angle threshold value; or
a condition in which a speed difference between the plurality of objects detected by the plurality of sensors is equal to or less than a predetermined speed threshold value.

20. An information generation device comprising:
a processor
that acquires sensor information indicating a measurement result of a detection target area from each of a plurality of sensors having the detection target area that is common to the plurality of sensors,
that determines whether or not each of the plurality of sensors detects an object existing in the same predetermined area on the basis of a plurality of pieces of the sensor information acquired, and
that generates first display information for separately displaying the object that is detected by each of the plurality of sensors in a case where a determination result is positive and a predetermined condition for determining whether or not a plurality of the objects detected by the plurality of sensors are the same object is not satisfied, and generates second display information for displaying the object detected by each of the plurality of sensors in a display style different from a display style of the first display information in a case where the determination result is positive and the predetermined condition is satisfied, wherein
the second display information includes information for displaying single object at an average position of the plurality of objects detected by the plurality of sensors.

* * * * *